UNITED STATES PATENT OFFICE.

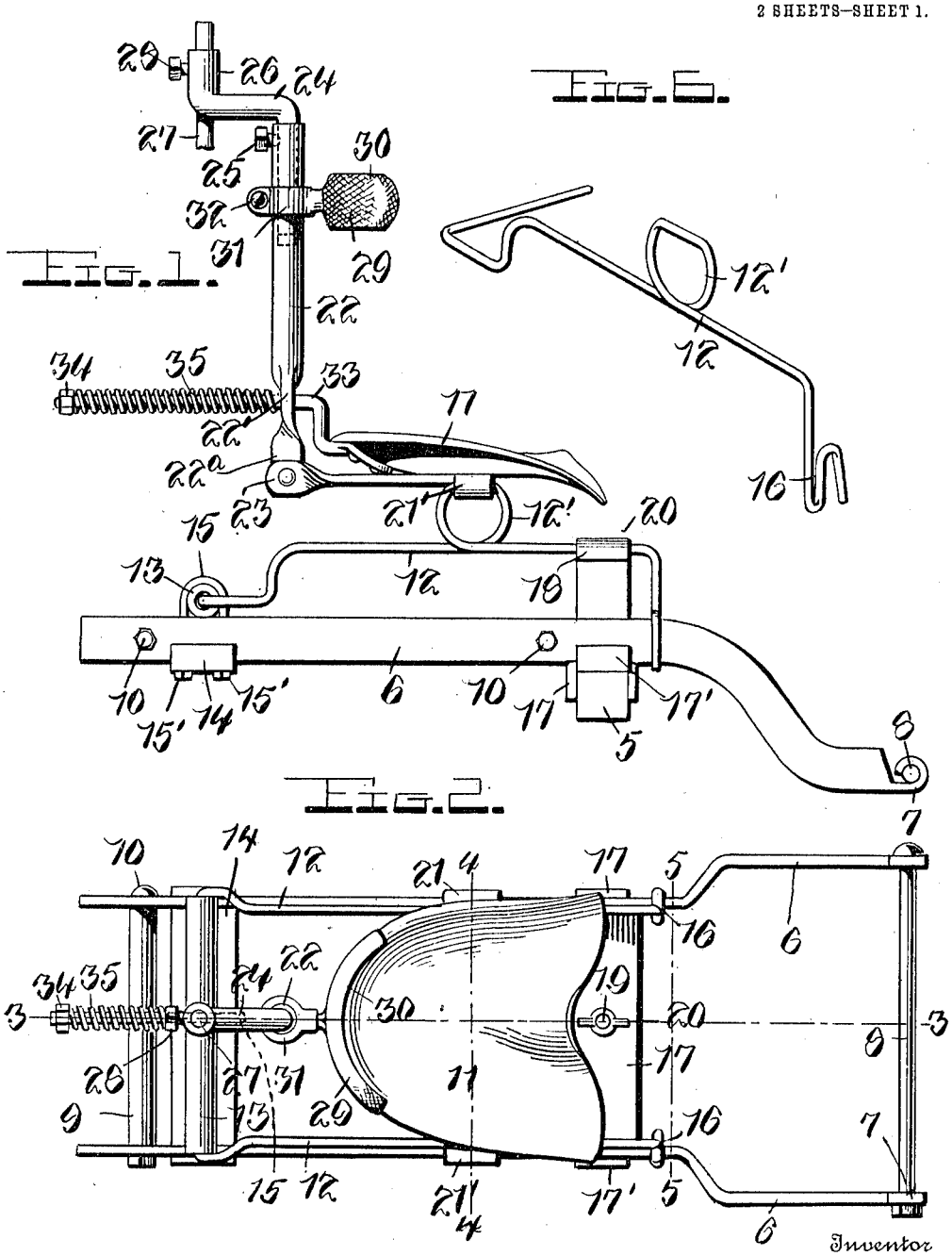

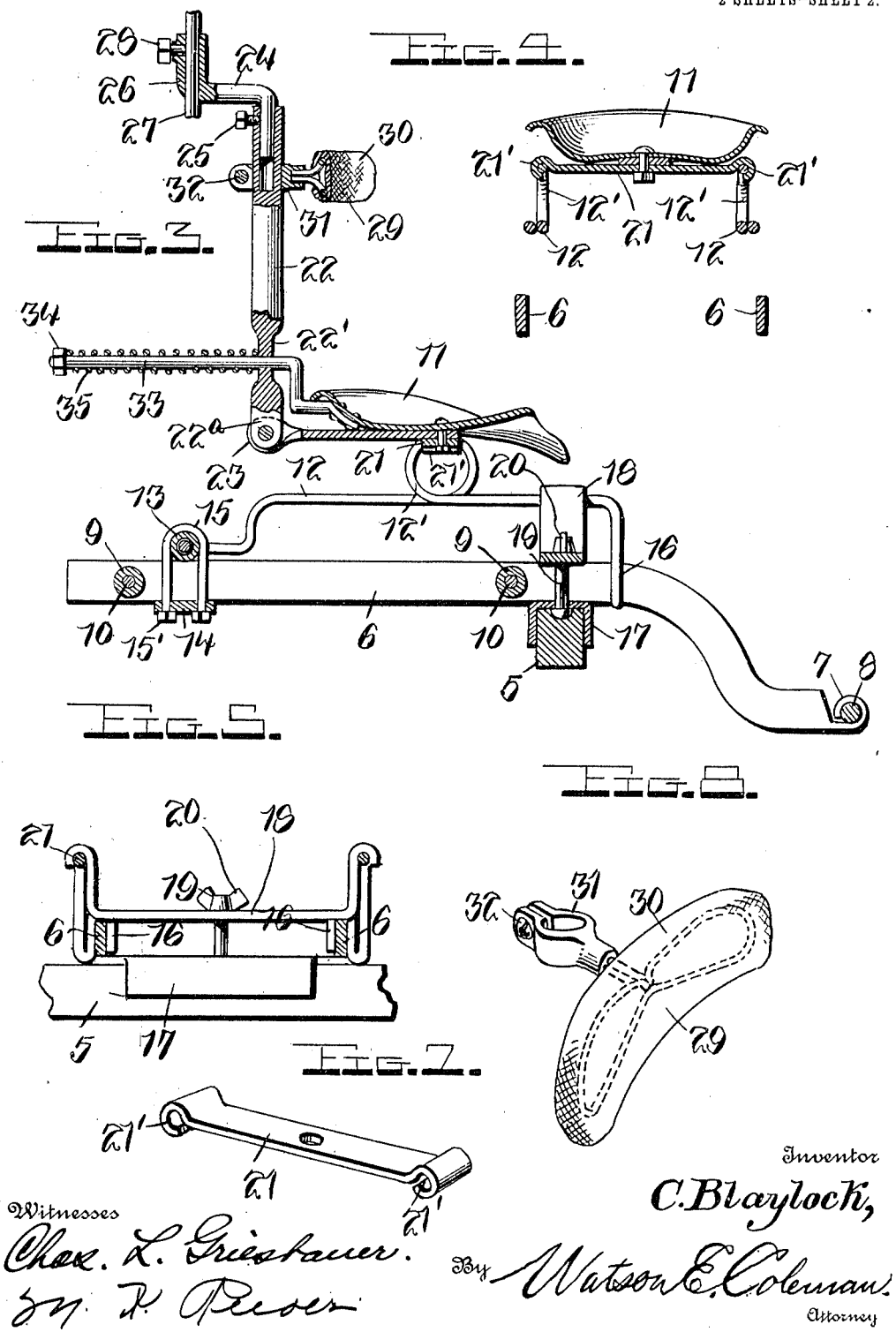

CLAUDE BLAYLOCK, OF DUCK HILL, MISSISSIPPI.

SEAT.

1,001,610.  Specification of Letters Patent.  Patented Aug. 29, 1911.

Application filed December 3, 1910. Serial No. 595,458.

*To all whom it may concern:*

Be it known that I, CLAUDE BLAYLOCK, a citizen of the United States, residing at Duck Hill, in the county of Montgomery and State of Mississippi, have invented certain new and useful Improvements in Seats, of which the following is a specification, reference being had to the accompanying drawings.

This invention relates to an improved driver's seat and has for its object to provide a device of this character whereby the driver may be comfortably seated and all shocks and jars to the body of the vehicle assimilated by the seat supporting means.

Another object is to provide a driver's seat which is especially adapted for use upon agricultural machines, novel means being provided for mounting the seat upon the machine frame, a suitable back rest being associated with the seat and adjustable with respect thereto.

A still further object of the invention is to provide a driver's seat and an umbrella or shade supporting means arranged at the back of the seat, said means being yieldingly held in position for movement upon the pressure of the driver's body against the same, said means carrying an adjustable back rest.

With these and other objects in view, the invention consists of the novel features of construction, combination and arrangement of parts hereinafter fully described and claimed, and illustrated in the accompanying drawings, in which—

Figure 1 is a side elevation of a device constructed in accordance with my invention; Fig. 2 is a top plan view; Fig. 3 is a section taken on the line 3—3 of Fig. 2; Fig. 4 is a section taken on the line 4—4 of Fig. 2; Fig. 5 is a section taken on the line 5—5 of Fig. 2; Fig. 6 is a detail perspective view of one of the spring seat supports; Fig. 7 is a detail perspective view of the bearing plate carried by the seat; and Fig. 8 is a detail perspective view of the adjustable back support.

Referring more particularly to the drawings 5 indicates a bolster or cross bar and 6 the parallel longitudinal seat supporting bars. These seat supporting bars are curved at one end and formed into hooks 7 which are adapted to engage over the tongue bolt 8. The bars 6 are rigidly secured together by means of the sleeves 9 through which the connecting bolts 10 extend, said bolts being headed upon one end and having clamping nuts threaded upon their other ends to rigidly secure the sleeves and supporting bars together. Any number of these connecting members may be used but I preferably employ two, one of which connects the bars at their rear ends, the other being located adjacent to the cross bar 5.

The driver's seat 11 is disposed above the supporting bar 6 rearwardly of the cross bar 5 and is supported upon the spring rods 12. The rear ends of these rods are bent at right angles and disposed in the ends of a hollow cylinder 13 which is arranged upon the seat supporting bars 6 adjacent to their rear ends. A plate 14 connects the bars 6 and is disposed beneath the cylinder 13. A clip 15 extends around the cylinder 13 and has its ends passed through apertures in said plate. Nuts 15' are threaded on the ends of said clip whereby the cylinder 13 may be rigidly secured in position. The other ends of the spring rods 12 are bent to form reversed hooks as shown at 16. One of these hooks is disposed over the supporting bar 6, the other being arranged outside of said bar to give the supporting rods the proper resiliency. A plate 17 substantially U-shaped in cross section is arranged upon the cross bar 5 between the longitudinal bars 6, the ends of said plate being bent upwardly and disposed upon the outer faces of the bars 6 as shown at 17'. A yoke member 18 is arranged above the plate 17 and has a hook formed on each end for engagement upon the rods 12. A bolt 19 extends through the lower plate 17 and through the yoke member 18. Upon the upper end of this bolt a wing nut 20 is threaded and by adjusting the same the yoke member is clamped upon the spring rods. The rods are thus rigidly held in position at their ends upon the longitudinal bar 6, and the transverse U-shaped plate 17 also serves as an additional connecting member between the longitudinal bars.

Intermediate of their ends the rods 12 are each formed with a single coil 12'. The intermediate portion of this coil is straight and is disposed in parallel relation to the main portions of the supporting rods. These straight portions of the coils are disposed upon the under side of the seat 11 and a bearing plate 21 is secured to said seat intermediate of its ends, the ends of said plate being bent as at 21' to receive the straight portion of the coil 12'. Thus the seat may be easily and quickly removed when desired by simply removing the bearing plate 21.

In order to protect the driver in inclement weather and from the sun's rays, I provide an umbrella support which is arranged upon the rear of the seat. This support comprises a standard 22 which is preferably of tubular form and at its lower end is bent as at 22' to provide a flattened portion. Beyond this flattened portion the extreme end of the standard is again bent and disposed at right angles as shown at 22ª. This end of the standard is pivotally mounted upon an ear 23' formed upon the end of a rearwardly extending arm 23 which is secured to and extends from beneath the seat 11. A Z-shaped rod 24 is disposed in the upper end of the tubular standard 22 and is adjustable therein. This rod is secured in its adjusted position by means of a set screw 25. The upper vertically disposed end of the rod is bored as shown at 26 to receive the reduced end of the umbrella staff 27. This staff is adjustable in the end of the rod 24 and is secured in its adjusted position by means of the set screw 28. A back support 29 is vertically movable upon the standard 22. This support is in the form of a bowed padded board 30 to which is centrally secured the U-shaped clamping member 31. This clamping member is adapted to embrace the standard 22 and the ends thereof are adapted to be drawn together and clamped upon said standard by means of the screw 32. The flattened portion 22' of the standard is provided with an aperture through which a rod 33 extends, said standard being movable upon said rod. The end of this rod is disposed beneath the seat and extends through the same and the arm 23, thereby serving as an additional means of security for said arm. A nut 34 is threaded on the outer end of the rod 33 and a coiled spring 35 is disposed upon said rod between the nut and the standard. Thus it will be noted that the standard is yieldingly supported in a vertical position at the rear of the driver's seat while at the same time it will readily give under the pressure of the driver's body during his natural movements occasioned by the handling of the team.

From the foregoing it will be seen that I have devised a very efficient and comparatively simple arrangement of parts whereby the seat is mounted upon the vehicle so that all shocks and jars which would otherwise be imparted to the seat are assimilated. The umbrella may be easily and quickly adjusted in the upper end of the standard as the sun rises or declines in the heavens so as to permit the driver to receive the benefit of fresh air while at the same time protecting him from the rays of the sun. All parts of the device are of common form and may be readily obtained at a minimum cost thus rendering the device comparatively inexpensive to manufacture.

While I have shown and described the preferred embodiment of the invention and arrangement of the various parts, it will be understood that the same is susceptible of various modifications in the details of construction without departing from the essential feature or sacrificing any of the advantages thereof.

Having thus described the invention what is claimed is:—

1. In a device of the character described, the combination of spaced longitudinal parallel bars, a transverse bar extending beneath said bars adjacent to their forward ends, a plurality of transverse connecting members arranged between the bars, a U-shaped plate embracing the transverse bar between the longitudinal bars and having its ends turned up on the outer faces of said bars, a seat disposed above and centrally between the longitudinal bars, parallel resilient rods extending beneath said seat, means for securing the seat upon said rods, the forward ends of said rods being each formed with a hook and engaged upon the longitudinal bars, a yoke member disposed above said U-shaped plate and engaged at its ends upon said rods, a bolt connecting said plate and yoke member having a nut threaded upon its end for binding engagement with said member to clamp the same on the rods and prevent their longitudinal movement, and means arranged upon the rear ends of said longitudinal bars to hold the same against movement.

2. In a device of the character described, the combination of spaced longitudinal bars, a cross-bar extending beneath said longitudinal bars adjacent to their forward ends, means rigidly connecting said longitudinal bars, resilient supporting rods arranged above said longitudinal bars and bearing thereon at their forward ends, a retaining plate adjustable upon said cross bar and engaging said rods at their forward ends to prevent longitudinal movement of the same upon said longitudinal bars, a sleeve fixed upon said longitudinal bars at their ends, said supporting rods extending into said sleeve, spring coils formed with respect to said supporting rods, and a driver's seat mounted upon said coils.

3. In a device of the character described, the combination of a driver's seat and means for yieldingly supporting the same, a tubular standard pivotally mounted in the rear of said seat, a rod secured to the seat extending through the standard adjacent its lower end, a coiled spring on said rod, a nut threaded on the end of the rod engaging said spring, said spring normally holding said standard in a vertical position, a rod adjustable in the upper end of said standard, means for adjustably holding an umbrella staff in said rod, and a back support longitudinally adjustable on the standard.

In testimony whereof I hereunto affix my signature in the presence of two witnesses.

CLAUDE BLAYLOCK.

Witnesses:
J. C. ONEAL,
HENRY BLAYLOCK.

Copies of this patent may be obtained for five cents each, by addressing the "Commissioner of Patents, Washington, D. C."